US010069327B2

(12) United States Patent
Lee et al.

(10) Patent No.: US 10,069,327 B2
(45) Date of Patent: Sep. 4, 2018

(54) ELECTRONIC DEVICE AND METHOD FOR CHARGING BATTERY BASED ON A PLURALITY OF POWER SOURCES

(71) Applicant: Samsung Electronics Co., Ltd., Gyeonggi-do (KR)

(72) Inventors: Myungkee Lee, Gyeongsangbuk-do (KR); Joohan Kim, Gyeongsangbuk-do (KR); Jinman Kim, Gyeongsangbuk-do (KR); Hoyeon Kim, Gyeongsangbuk-do (KR); Chulhyung Yang, Gyeongsangbuk-do (KR); Jiwoo Lee, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 118 days.

(21) Appl. No.: 15/235,674

(22) Filed: Aug. 12, 2016

(65) Prior Publication Data
US 2017/0063140 A1    Mar. 2, 2017

(30) Foreign Application Priority Data
Aug. 28, 2015  (KR) .......................... 10-2015-0121980

(51) Int. Cl.
| H01M 10/44 | (2006.01) |
| H01M 10/46 | (2006.01) |
| H02J 7/02 | (2016.01) |
| H02J 50/10 | (2016.01) |
| H02J 7/04 | (2006.01) |
| H04B 7/00 | (2006.01) |

(52) U.S. Cl.
CPC ............. H02J 7/025 (2013.01); H02J 7/045 (2013.01); H02J 50/10 (2016.02); H04B 7/00 (2013.01)

(58) Field of Classification Search
CPC ............................... H02J 7/1423; H02J 7/007
USPC .... 320/103, 107, 108, 114, 138; 307/43, 46, 307/66
See application file for complete search history.

(56) References Cited

U.S. PATENT DOCUMENTS

| 7,034,503 B2 * | 4/2006 | Veselic .................. G06F 1/266 320/128 |
| 2010/0231175 A1 * | 9/2010 | Noda ..................... H01M 10/44 320/162 |
| 2011/0227536 A1 | 9/2011 | Bourilkov et al. |

(Continued)

FOREIGN PATENT DOCUMENTS

KR    1020130142312    12/2013

Primary Examiner — Edward Tso
(74) Attorney, Agent, or Firm — The Farrell Law Firm, P.C.

(57) ABSTRACT

An electronic device and a method for charging a battery of the electronic device are provided. The electronic device includes a housing; a battery disposed within the housing; a first interface electrically or electromagnetically connected to a first external power source; a second interface electrically or electromagnetically connected to a second external power source; and a circuit electrically connected to the battery, the first interface, and the second interface, wherein the circuit changes a first voltage output from the first interface based on a second voltage output from the second interface, changes a first current output from the first interface based on a second current output from the second interface, and charges the battery based on the changed first current and second current.

20 Claims, 10 Drawing Sheets

(56) References Cited

U.S. PATENT DOCUMENTS

2013/0106195 A1* 5/2013 Kusch .................. H02J 7/1423
  307/82
2013/0334883 A1  12/2013 Kim et al.
2016/0172905 A1*  6/2016 Dorn ........................ H02J 3/38
  307/86

* cited by examiner

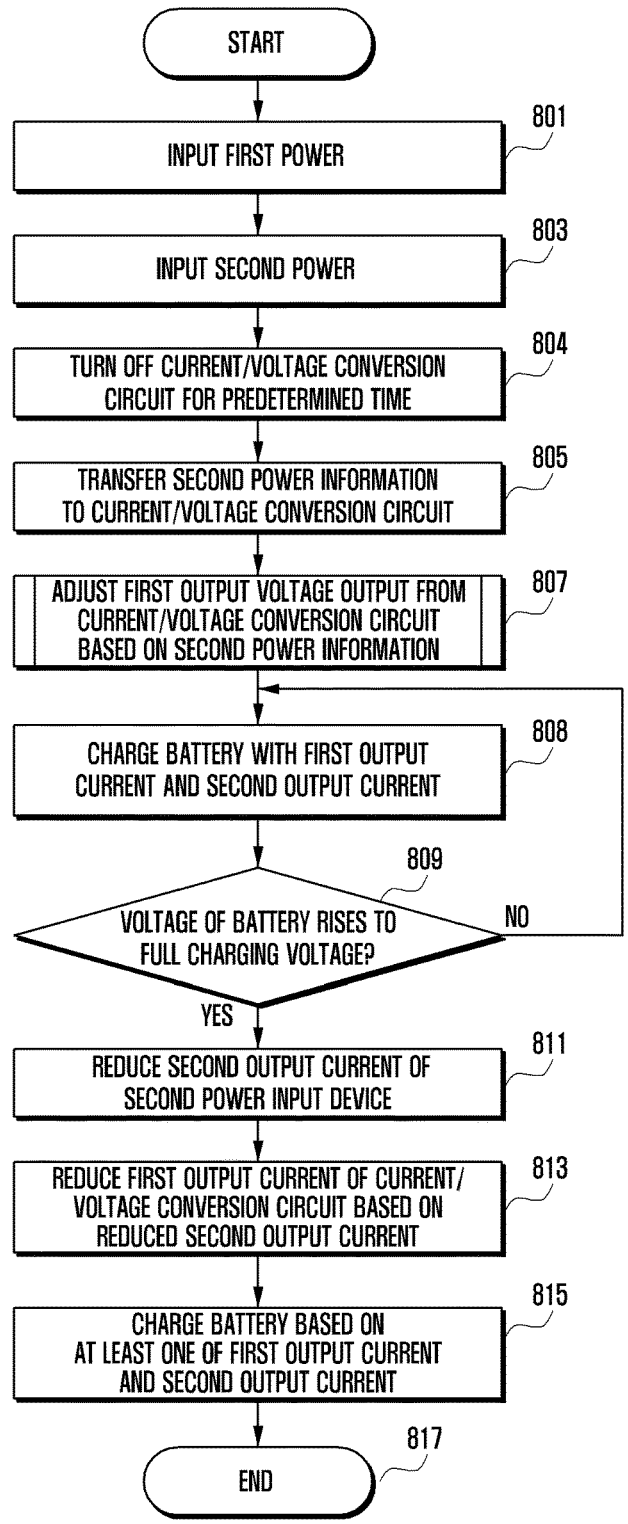

ELECTRONIC DEVICE AND METHOD FOR CHARGING BATTERY BASED ON A PLURALITY OF POWER SOURCES

PRIORITY

This application claims priority under 35 U.S.C. § 119(a) to Korean Patent Application Serial No. 10-2015-0121980, which was filed in the Korean Intellectual Property Office on Aug. 28, 2015, the entire disclosure of which is incorporated herein by reference.

BACKGROUND

1. Field of the Disclosure

The present disclosure relates generally to battery charging, and more specifically, to an electronic device and a method of charging a battery of the electronic device with a plurality of power sources.

2. Description of the Related Art

As usage time of electronic devices increases, research with respect to batteries that may enable use of the increasingly-used electronic device has been ongoing. In particular, research regarding methods of charging batteries has been actively performed. Methods of charging batteries include wired and wireless charging methods.

An electronic device that is able to perform charging with respect to two charging methods may select, through a switch, one of a power input device that performs wired charging and a power input device that performs wireless charging. The electronic device may connect the selected power input device to a charge circuit.

When the charge circuit of the electronic device charges a battery of the electronic device using a plurality of power input devices that use the same or different methods, a reverse current may occur, due to a voltage difference between the plurality of power input devices, which may damage the charge circuit.

SUMMARY

The present disclosure has been made to address at least the above problems and at least the advantages described below. Accordingly, an aspect of the present disclosure provides a method of charging a battery of an electronic device using a plurality of power input devices having different voltages and the electronic device for implementing the method.

According to an aspect of the present disclosure, an electronic device is provided. The electronic device includes a housing; a battery disposed within the housing; a first interface electrically or electromagnetically connected to a first external power source; a second interface electrically or electromagnetically connected to a second external power source; and a circuit electrically connected to the battery, the first interface, and the second interface, wherein the circuit changes a first voltage output from the first interface based on a second voltage output from the second interface, changes a first current output from the first interface based on a second current output from the second interface, and charges the battery based on the changed first current and second current.

According to another aspect of the present disclosure, a method of charging a battery of an electronic device is provided. The method includes detecting an input of first external power from a first external power source and second external power from a second external power source; changing a first voltage output from the first external power source based on a second voltage input by the second external power source; changing a first current output from the first external power source based on a second current input by the second external power source; and charging the battery based on the first current and the second current.

According to another aspect of the present disclosure, an electronic device is provided. The electronic device includes a housing; a battery disposed within the housing; a first interface electrically or electromagnetically connected to a first external power source; a second interface electrically or electromagnetically connected to a second external power source; and a circuit electrically connected to the battery, the first interface, and the second interface, wherein the circuit includes: a battery charge circuit having one side connected in series to the second interface and the other side connected in series to the battery; a current/voltage conversion circuit having one side connected in series to the first interface and the other side connected in series to the battery charge circuit; and a comparison circuit located between the second interface and the current/voltage conversion circuit and having one side connected in series to the second interface and an other side connected in series to the current/voltage conversion circuit.

BRIEF DESCRIPTION OF THE DRAWINGS

The above and other aspects, features, and advantages of the present disclosure will be more apparent from the following detailed description when taken in conjunction with the accompanying drawings, in which:

FIGS. 7A, 7B, and 8 are flowcharts illustrating an example of charging a battery in a circuit having a plurality of power inputs according to an embodiment of the present disclosure.

DETAILED DESCRIPTION OF EMBODIMENTS

Figure 1:
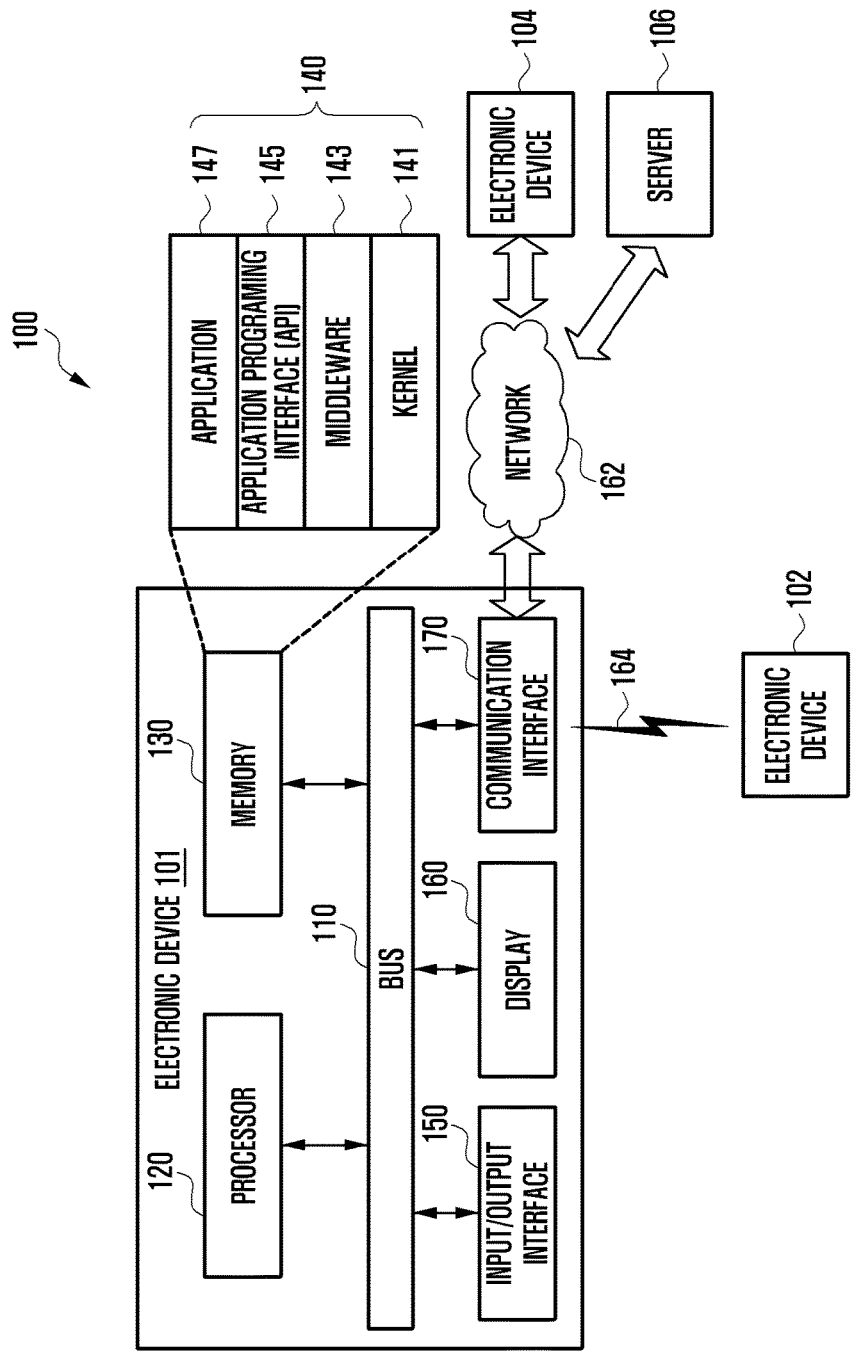
FIG. 1 is a block diagram illustrating a network environment according to various embodiments of the present disclosure.

Embodiments of the present disclosure are described in detail as follows with reference to the accompanying drawings. Descriptions of well-known functions and constructions may be omitted for clarity and conciseness.

The terms and words used in the following description and claims are not limited to their dictionary definitions, but are merely used to enable a clear and consistent understanding of the present disclosure.

Herein, the singular forms "a", "an", and "the" of terms, include plural referents, unless the context clearly dictates otherwise. Thus, for example, reference to "a component surface" includes reference to one or more of such surfaces.

Expressions such as "include" and "may include", which may be used in the present disclosure to denote the presence of the disclosed functions, operations, and constituent elements, do not limit one or more additional functions, operations, and constituent elements. In the present disclosure, terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are merely used to distinguish an element from the other elements. For example, a first user device and a second user device indicate different user devices, although both device are user devices. As another further example, a first element may be referred to as a second element, and similarly, a second element may be referred to as a first element without departing from the scope of the present disclosure.

When a component is referred to as being "connected" or "accessed" to another component, not only is the component connected or accessed to the other component, but another component may exist between the component and the other component. By contrast, when a component is referred to as being "directly connected" or "directly accessed" to another component, it should be understood that there is no component therebetween.

The terms used in the present disclosure are used to describe specific various embodiments, and are not intended to limit the present disclosure.

Unless otherwise defined, all terms including technical and/or scientific terms used herein have the same definitions as commonly understood by one of ordinary skill in the art to which the present disclosure pertains.

Herein, an electronic device may correspond to at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., a moving picture experts group phase 1 or phase 2 (MPEG-1 or MPEG-2) audio layer 3 (MP3) player), a mobile medical device, a camera, or a wearable device. Examples of the wearable device include a head-mounted-device (HMD) (e.g., electronic eyeglasses), electronic clothing, an electronic bracelet, an electronic necklace, an appcessory, an electronic tattoo, a smart watch, and the like.

The electronic device, according to the embodiments of the present disclosure, may also be a smart home appliances. Examples of smart home appliances include a television (TV), a digital video disc (DVD) player, an audio system, a refrigerator, an air-conditioner, a cleaning device, an oven, a microwave oven, a washing machine, an air cleaner, a set-top box, a TV box, a game console, an electronic dictionary, an electronic key, a camcorder, an electronic album, or the like.

The electronic device, according to embodiments of the present disclosure, may also include medical devices (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, an electronic equipment for ships (e.g., navigation equipment, gyrocompass, and the like), avionics, a security device, a head unit for vehicles, an industrial or home robot, an automatic teller machine (ATM), a point of sales (POS) system, and the like.

The electronic device, according to embodiments of the present disclosure, may also include furniture or a portion of a building/structure, an electronic board, an electronic signature receiving device, a projector, various measuring instruments (e.g., a water meter, an electric meter, a gas meter and a wave meter) and the like. The electronic may also include a combination of the devices listed above. In addition, the electronic device may be a flexible and/or contoured device. It should be obvious to those skilled in the art that the electronic device is not limited to the aforementioned devices.

Hereinafter, electronic devices according to embodiments of the present disclosure are described in detail with reference to the accompanying drawings. In the description, the term a 'user' may refer to a person or a device that uses or otherwise controls the electronic device, e.g., an electronic device having artificial intelligence.

FIG. 1 is a block diagram illustrating a network environment including an electronic device according to an embodiment of the present disclosure.

Referring to FIG. 1, an electronic device 101 of a network environment 100 includes a bus 110, a processor 120, a memory 130, an input/output (I/O) interface 150, a display 160 and a communication interface 170.

The bus 110 may be a communication circuit that connects the components to each other and transfers data (e.g., control messages) between the components.

The processor 120 may receive instructions from the components (e.g., the memory 130, I/O interface 150, display 160 and communication interface 170) via the bus 110, decode the instructions and perform corresponding operations or data processing according to the decoded instructions.

The memory 130 may store instructions or data transferred from/created in the processor 120 and/or the other components (e.g., I/O interface 150, display 160 and communication interface 170). The memory 130 include programming modules 140, such as a kernel 141, a middleware 143, an application programming interface (API) 145, and an application module 147. Each of the programming modules may be software, firmware, hardware or a combination thereof.

The kernel 141 may control or manage system resources (e.g., the bus 110, processor 120, and memory 130) used to execute operations or functions of the programming modules, e.g., the middleware 143, API 145, and application module 147. The kernel 141 may also provide an interface that can access and control/manage the components of the electronic device 101 via the middleware 143, API 145, and application module 147.

The middleware 143 may make it possible for the API 145 or application module 147 to perform data communication with the kernel 141. The middleware 143 may also perform control operations (e.g., scheduling and load balancing) for task requests transmitted from the application module 147 using, for example, a method for assigning the order of priority to use the system resources (e.g., the bus 110, processor 120, and memory 130) of the electronic device 101 to at least one of the applications of the application module 147.

The API 145 is an interface that allows the application module 147 to control functions of the kernel 141 or middleware 143. For example, the API 145 may include at least one interface or function (e.g., instruction) for file control, window control, character control, video process, and the like.

In embodiments of the present disclosure, the application module 147 may include applications that are related to short message service (SMS)/multimedia messaging service (MMS), email, calendar, alarm, health care (e.g., an application for measuring blood sugar level, a workout application, and the like), and environment information (e.g., atmospheric pressure, humidity, temperature, and the like). The application module 147 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, and the like), to an external electronic device (e.g., electronic device 104). In addition, the notification relay application may receive notification information from an external electronic device (e.g., electronic device 104) and provide it to the user. The device management application can manage (e.g., install, delete, or update) part of the functions of an external electronic device (e.g., electronic device 104) communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, and the like.

In various embodiments of the present disclosure, the application module 147 may also include applications designated according to attributes (e.g., type of electronic device) of the external electronic device (e.g., electronic device 104). For example, if the external electronic device is an MP3 player, the application module 147 may include an application related to music playback. If the external electronic device is a mobile medical device, the application module 147 may include an application related to health care. The application module 147 may include an application designated in the electronic device 101 and applications transmitted from external electronic devices (e.g., server 106, electronic device 104, and the like).

The I/O interface 150 may receive instructions or data from the user via an I/O system (e.g., a sensor, keyboard or touch screen) and transfers them to the processor 120, memory 130 or communication interface 170 through the bus 110. For example, the I/O interface 150 may provide data corresponding to a user's touch input to a touch screen to the processor 120. The I/O interface 150 may receive instructions or data from the processor 120, memory 130 or communication interface 170 through the bus 110, and output them to an I/O system (e.g., a speaker or a display). For example, the I/O interface 150 may output voice data processed by the processor 120 to a speaker.

The display 160 may display information (e.g., multimedia data, text data, and the like) on a screen so that the user can view it.

The communication interface 170 may communicate between the electronic device 101 and an external system (e.g., a first external electronic device 102, a second external electronic device 104, or server 106). For example, the communication interface 170 may connect to a network 162 in a wireless or wired mode, and communicate with the external system. Wireless communication may include Wi-Fi, Bluetooth (BT), near field communication (NFC), global positioning system (GPS) or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), and the like). In addition, the wireless communication may include, for example, short range communication 164. Wired communication may include universal serial bus (USB), high definition multimedia interface (HDMI), recommended standard 232 (RS-232), plain old telephone service (POTS), and the like.

According to an embodiment of the present disclosure, the network 162 may be a telecommunication network. The telecommunication network may include a computer network, Internet, Internet of Things (IoT), telephone network, and the like. The protocol for communication between the electronic device 101 and the external system, e.g., transport layer protocol, data link layer protocol, or physical layer protocol, may be supported by at least one of the application module 147, API 145, middleware 143, kernel 141 and communication interface 170.

Figure 2:
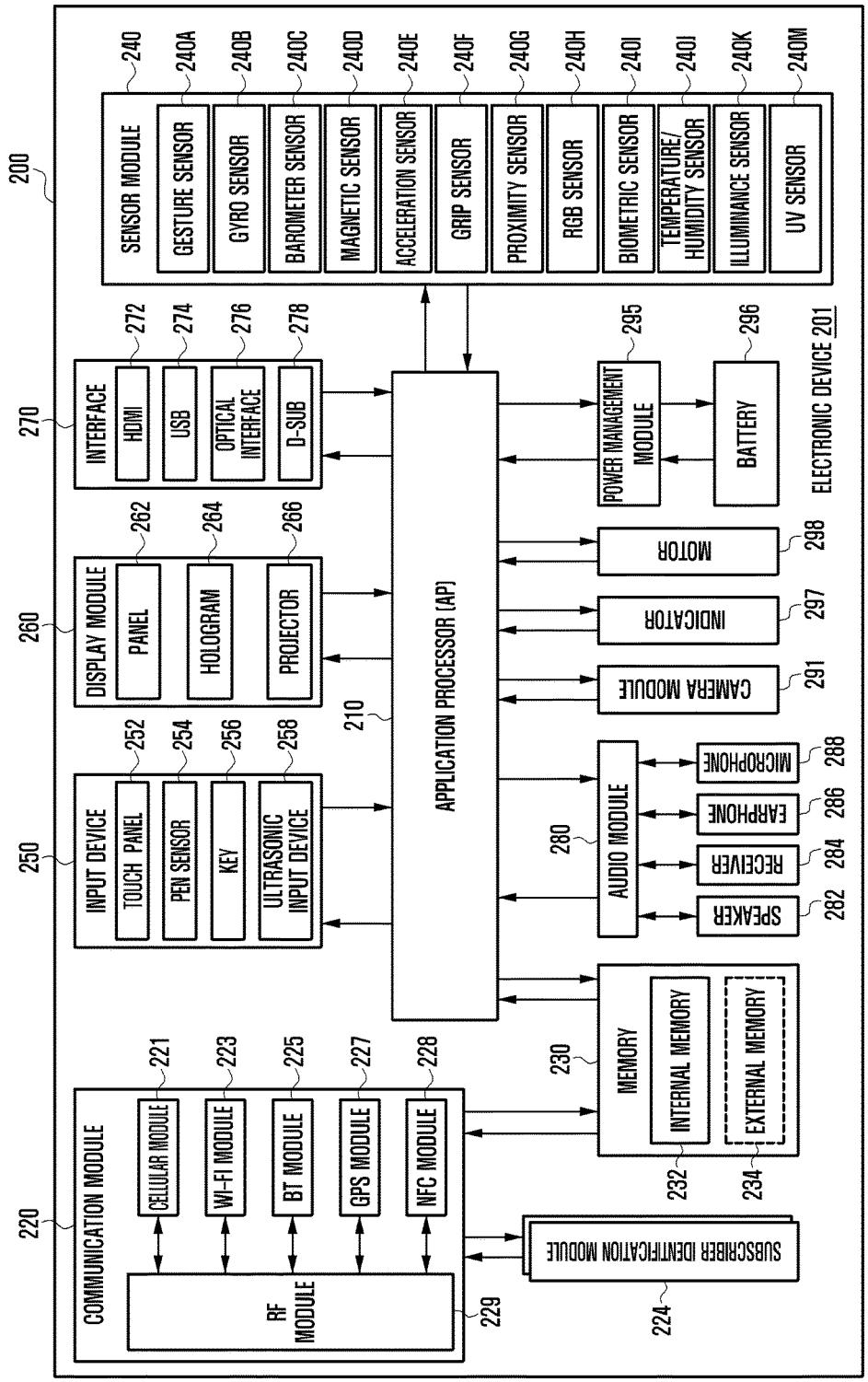
FIG. 2 is a block diagram illustrating a configuration of an electronic device according to various embodiments of the present disclosure.

FIG. 2 is a block diagram illustrating an electronic device according to an embodiment of the present disclosure.

Referring to FIG. 2, an electronic device 201 may form all or part of the electronic device 101 of FIG. 1. The electronic device 201 includes one or more processors of an application processor (AP) 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a number of hardware or software components connected thereto by executing the operation system or applications, process data including multimedia data, and perform corresponding operations. The AP 210 may be implemented with a system on chip (SoC). According to an embodiment of the present disclosure, the AP 210 may further include a graphics processing unit (GPU).

The communication module 220 (e.g., the communication interface 170 of FIG. 1) performs communication for data transmission/reception between the other electronic devices (e.g., the first external electronic device 102, the second external electronic device 104, or the server 106 of FIG. 1) that are connected to the electronic device (e.g., electronic device 101 of FIG. 1) via the network. The communication module 220 includes a cellular module 221, a Wi-Fi module 223, a BT module 225, a GPS module 227, an NFC module 228 and a radio frequency (RF) module 229.

The cellular module 221 may provide voice calls, video calls, SMS or Internet service, and the like, via a communication network (e.g., LTE, LTE-A, CDMA, WCDMA, UMTS, Wi-Bro, GSM, and the like). The cellular module 221 may also perform identification or authentication for electronic devices in a communication network by using SIM card 224. According to an embodiment of the present disclosure, the cellular module 221 may perform part of the functions of the AP 210. For example, the cellular module 221 may perform part of the functions for controlling multimedia.

According to an embodiment of the present disclosure, the cellular module 221 may include a communication processor (CP). The cellular module 221 may be formed of, for example, an SoC. Although the embodiment of the present disclosure shown in FIG. 2 is implemented in such a way that the cellular module 221 (e.g., a CP), the power management module 295, the memory 230, and the like, are separated from the AP 210, embodiments of the present disclosure can be modified such that the AP 210 includes at least part of the listed elements or other elements of the device 201 (e.g., the cellular module 221).

According to an embodiment of the present disclosure, the AP 210 or the cellular module 221 (e.g., CP) may load instructions or data transmitted to and from at least one of a non-volatile memory or other components, on a volatile memory and then process them. The AP 210 or the cellular module 221 may also store data which is transmitted from/created in at least one of the components, in a non-volatile memory.

The Wi-Fi module 223, the BT module 225, the GPS module 227 and the NFC module 228 may include processors for processing transmission/reception of data, respectively. Although the embodiment of the present disclosure shown in FIG. 2 is implemented such that the cellular module 221, Wi-Fi module 223, BT module 225, GPS module 227, and NFC module 228 are separated from each other, embodiments of the present disclosure can be modified such that parts of the elements (e.g., two or more elements) are included in an integrated chip (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi 223, may be implemented with an SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, an embodiment can be modified in such a way that at least one of the elements transmit or receive RF signals via a separate RF module.

The SIM card 224 may be fitted into a slot of the electronic device. The SIM card 224 may include unique identification information, e.g., integrated circuit card identifier (ICCID), or subscriber information, e.g., international mobile subscriber identity (IMSI).

The memory 230 (e.g., the memory 130 of FIG. 1) includes built-in or internal memory 232 and an external memory 234. The built-in memory 232 may include at least one of a volatile memory, e.g., dynamic random access memory (DRAM), static RAM (SRAM), synchronous dynamic RAM (SDRAM), and the like, non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, and the like.

According to an embodiment of the present disclosure, the built-in memory 232 may be a solid state drive (SSD). The external memory 234 may further include a flash drive, e.g., compact flash (CF), secure digital (SD), micro-SD, mini-SD, extreme digital (XD), a memory stick, and the like. The external memory 234 may be functionally connected to the electronic device via various types of interfaces. The electronic device 101 may further include storage devices or storage media such as hard drives.

The sensor module 240 may measure a physical quantity or sense operation states of the electronic device 201 and convert the measured or sensed data into electrical signals. The sensor module 240 includes, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red-green-blue (RGB) sensor), a biosensor 240I, a temperature/humidity sensor 240J, an luminance sensor 240K, and an ultra-violet (UV) sensor 240M.

The input system 250 includes a touch panel 252, a pen sensor 254 (e.g., a digital pen sensor), a key 256 and an ultrasonic input device 258. The touch panel 252 may sense touches using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel can also sense mechanical/physical touches or proximity of an object. The touch panel 252 may further include a tactile layer. When including the tactile layer, the touch panel 252 can also provide tactile feedback to the user.

The pen sensor 254 (e.g., a digital pen sensor) may perform detection in a same or similar manner as receiving a user's touch input or by using a separate recognition sheet. The key 256 may include mechanical buttons, optical keys or a key pad. The ultrasonic input device 258 can sense sounds via a microphone 288 of the electronic device 201 by using an input tool for generating ultrasonic signals, and then receiving and checking data associated with the signals. The ultrasonic input device 258 can sense signals in a wireless mode. According to an embodiment of the present disclosure, the electronic device 201 may also receive a user's inputs from an external system (e.g., a computer or server) via the communication module 220.

The display module 260 (e.g., display 160 of FIG. 1) includes, for example, a panel 262, a hologram unit 264, and a projector 266. The panel 262 may be implemented with a liquid crystal display (LCD), active matrix organic light emitting diodes (AMOLEDs), or the like. The panel 262 may be implemented in a flexible, transparent, impact-resistant, and/or wearable form. The panel 262 may form a single module with the touch panel 252. The hologram unit 264 shows a three-dimensional image in the air using interference of light. The projector 266 may display images by projecting light on a screen. The screen may be placed, for example, inside or outside of the electronic device 201. In an embodiment of the present disclosure, the display module 260 may further include a control circuit for controlling the panel 262, the hologram unit 264, or the projector 266.

The interface 270 includes, for example, a HDMI 272, a USB 274, an optical interface 276, a D-subminiature (D-sub) 278, and the like. The interface 270 may also be included in the communication interface 170 shown in FIG. 1. The interface 270 may also include a mobile high-definition link (MHL) interface, an SD card, a multi-media card (MMC) interface, an infrared data association (IrDA) standard interface, or the like.

The audio module 280 may provide conversions between audio and electrical signals. At least part of the components in the audio module 280 may be included in the I/O interface 150 shown in FIG. 1. The audio module 280 may process audio output from/input to, for example, a speaker 282, a receiver 284, earphones 286, the microphone 288, and the like.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplied to the electronic device 201. The power management module 295 may include a power management integrated circuit (PMIC), a charger IC, a battery gauge, and the like.

The PMIC may be implemented in the form of an IC chip or SoC. Charging electric power may be performed in wired and/or wireless modes. The charger IC may charge a battery, and prevent input over-voltage or input over-current to the battery from a charger. In an embodiment of the present disclosure, the charger IC may be implemented with a wired charging type and/or a wireless charging type. Examples of the wireless charging type of the charger IC are a magnetic resonance type, a magnetic induction type, an electromagnetic type, an acoustic type, and the like. If the charger IC is implemented with a wireless charging type, it may also include an additional circuit for wireless charging, e.g., a coil loop, a resonance circuit, a rectifier, and the like.

The battery gauge may measure a residual amount of the battery 296, a level of voltage, a level of current, a temperature during the charge, and the like. The battery 296 stores electric power and supplies it to the electronic device 201. The battery 296 may include a rechargeable battery or a solar battery.

The indicator 297 shows states of the electronic device 201 or of the parts thereof (e.g., the AP 210), e.g., a booting state, a message state, a recharging state, and the like. The motor 298 converts an electrical signal into a mechanical vibration. The electronic device 201 may include a processor for supporting a mobile TV, e.g., a GPU. The mobile TV supporting processor may process media data that complies with standards of digital multimedia broadcasting (DMB), digital video broadcasting (DVB), media flow, and the like.

Each of the elements/units of the electronic device according to the present disclosure may be implemented with one or more components, and may be called different names according to types of electronic devices. The electronic device may include at least one element described above. The electronic device may also be modified in such a way as to remove part of the elements or include new elements. In addition, the electronic device may also be modified in such a way that parts of the elements are integrated into one entity that performs their original functions.

In the present disclosure, the term "module" refers to a unit including hardware, software, firmware or a combination thereof. For example, the term "module" may be used interchangeably with "unit," "logic," "logical block," "component," "circuit," and the like. A module may be a minimum identifiable unit or part of an integrated component. A module may also be a minimum unit or part thereof that can perform one or more functions of the module. A module may be implemented through mechanical or electronic modes. For example, modules may be implemented with at least one of an application specific integrated circuit (ASIC) chip, a field-programmable gate array (FPGAs) and a programmable-logic device that can perform functions that are known or that are yet be developed.

Figure 3:
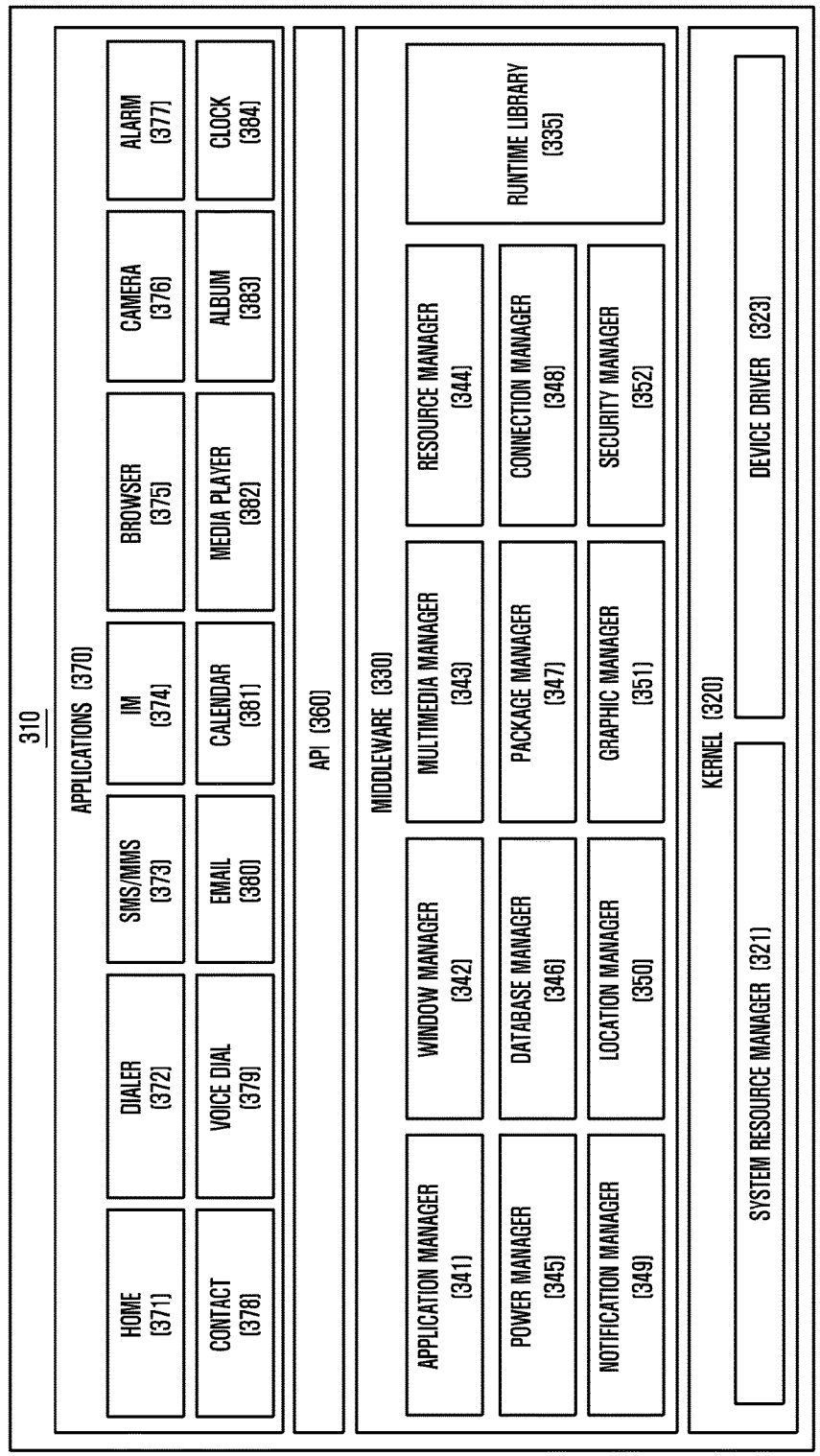
FIG. 3 is a block diagram illustrating a configuration of a program module according to various embodiments of the present disclosure.

FIG. 3 is a block diagram of a program module according to various embodiments of the present disclosure.

Referring to FIG. 3, a program module 310 may include an OS for controlling resources related to the electronic device and/or various applications executed in the operating system. The OS may be, for example, Android, iOS, Windows, Symbian, Tizen, Bada, or the like.

The program module 310 includes a kernel 320, middleware 330, an API 360, and applications 370. At least some of the program module 310 may be preloaded on an electronic device, or may be downloaded from the first external electronic device 102, the second external device 104, or the server 106.

The kernel 320 includes, for example, a system resource manager 311 and a device driver 312. The system resource manager 311 may perform control, allocation, retrieval, or the like, of system resources. According to an embodiment of the present disclosure, the system resource manager 311 may include a process manager, memory manager, file system manager, or the like. The device driver 312 may include, for example, a display driver, camera driver, Bluetooth driver, shared memory driver, USB driver, keypad driver, Wi-Fi driver, audio driver, or an inter-process communication (IPC) driver.

The middleware 330 may provide a function required by the applications 370 in common, or provide various functions to the applications 370 through the API 360 so that the applications 370 can efficiently use limited system resources within the electronic device. According to an embodiment of the present disclosure, the middleware 330 includes, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform input/output management, memory management, functionality for an arithmetic function, or the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power source, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements as required.

The API 360 may be, for example, a set of API programming functions, and may be provided with a different configuration according to an OS. For example, one API set may be provided for each platform. Two or more API sets may be provided for each platform.

The applications 370 may include, for example, one or more applications which can provide functions such as home 371, dialer 372, short message service (SMS)/multimedia message service (MMS) 373, instant message (IM) 374, browser 375, camera 376, alarm 377, contacts 378, voice dialer 379, email 380, calendar 381, media player 382, album 383, clock 384, health care (e.g., measure exercise quantity or blood sugar), or environment information (e.g., atmospheric pressure, humidity, or temperature information).

According to an embodiment of the present disclosure, the applications 370 may include an information exchange application supporting information exchange between the electronic device and an external electronic device (e.g., the first external electronic device 102 or the second external electronic device 104 of FIG. 1). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update), for example, at least one function of an external electronic device (e.g., the first external electronic device 102 or the second external electronic device 104 of FIG. 1) communicating with the electronic device (e.g., a function of turning on/off the external electronic device or some components thereof, or a function of adjusting luminance or a resolution of the display), applications operating in the external electronic device, or services provided by the external electronic device (e.g., a call service and a message service).

According to an embodiment of the present disclosure, the applications 370 may include an application (e.g., a health care application of a mobile medical device or the like) designated according to an attribute of the external electronic device (e.g., the first external electronic device 102 or the second external 104 of FIG. 1). The applications 370 may include an application received from the external electronic device (e.g., the server 106, or the electronic device 102 or 104). The applications 370 may include a preloaded application or a third party application which can be downloaded from the server. Names of the elements of the program module 310 may change depending on the type of OS.

Figure 4:
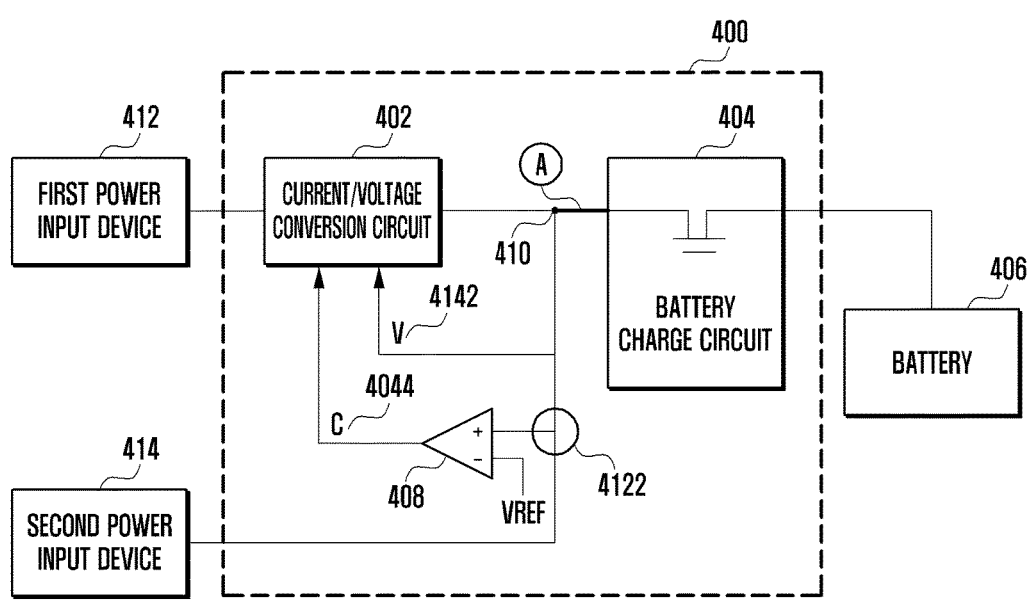
FIG. 4 is a circuit diagram illustrating constituent elements for charging a battery according to an embodiment of the present disclosure.

FIG. 4 is a circuit diagram illustrating constituent elements for charging a battery according to an embodiment of the present disclosure.

Referring to FIG. 4, an electronic device may charge a battery 406 using a plurality of power input devices (e.g., a first power input device 412 and a second power input device 414). Operations for charging the battery 406 may be controlled by a power management circuit 400 (e.g., the power management module 295 and hereinafter, the power management circuit 400), which is a separate constituent element other than a processor (e.g., the processor 210 of FIG. 2) that controls the electronic device. The power management circuit 400 includes a current/voltage conversion circuit 402, comparison circuit 408, and battery charge circuit 404 and may control operation thereof.

In the following embodiment of the present disclosure, there are two power input devices that include a device that supplies power to the electronic device (i.e., a first power input device 412 and a second power input device 414).

According to an embodiment of the present disclosure, the first power input device 412 may include a device that wirelessly supplies power to the electronic device, and the second power input device 414 may include a device that supplies power to the electronic device by wire.

According to an alternative embodiment of the present disclosure, the first power input device 412 may include a device that supplies power to the electronic device by wire, and the second power input device 414 may include a device that wirelessly supplies power to the electronic device.

Further, according to an embodiment of the present disclosure, the first power input device 412 and the second power input device 414 may each include a device that supplies power to the electronic device by wire.

Further, according to an embodiment of the present disclosure, the first power input device 412 and the second power input device 414 may each include a device that supplies power to the electronic device by wireless.

According to various embodiments, the first power input device 412 may supply power to the battery charge circuit 404 through the current/voltage conversion circuit 402. The first power input device 412 may include a first interface between the current/voltage conversion circuit 402 and the first power input device 412. The first power input device 412 may supply power (hereinafter, "first power") to the current/voltage conversion circuit 402 through the first interface.

As first power is supplied to the power management circuit 400, a current may be input from the first power input device 412 to the current/voltage conversion circuit 402 through the first interface and hereinafter, may be referred to as a first input current.

As first power is supplied to the power management circuit 400, a voltage may be input from the first power input device 412 to the current/voltage conversion circuit 402 through the first interface and hereinafter, may be referred to as a first input voltage.

According to various embodiments of the present disclosure, the second power input device 414 may supply power to the battery charge circuit 404 through a node 410 located between the current/voltage conversion circuit 402 and the battery charge circuit 404.

The second power input device 414 may include a second interface between the node 410 and the second power input device 414. The second power input device 414 may supply power (hereinafter, "second power") to the battery charge circuit 404 through the second interface.

As second power is supplied to the power management circuit 400, a current may be input from the second power input device 414 to a second interface and hereinafter, may be referred to as a second input current.

As second power is supplied to the power management circuit 400, a voltage may be input from the second power input device 414 to a second interface and hereinafter, may be referred to as a second input voltage.

A first output current may be input to the battery charge circuit 404 through the node 410. The first output current may be a current in which the current/voltage conversion circuit 402 adjusts a current of power input from the first power input device 412 to the current/voltage conversion circuit 402 through the first interface and that is output to the battery charge circuit 404.

A second output current may be input to the battery charge circuit 404 through the node 410. The second output current may be output from the second power input device 414 to the battery charge circuit 404 through the second interface.

According to embodiments, the battery charge circuit 404 may receive a current (hereinafter, "first output current") input from the current/voltage conversion circuit 402 through the node 410. The battery charge circuit 404 may receive a current (hereinafter, "second output current") input from the second power input device 414 through the node 410. Accordingly, the battery charge circuit 404 may receive the first output current input from the current/voltage conversion circuit 402 and receive the second output current input from the second power input device 414.

According to an embodiment of the present disclosure, when power is supplied from the second power input device 414, voltage feedback 4142, which is voltage measurement information of power supplied from the second power input device 414 may be transferred to the current/voltage conversion circuit 402 under the control of the power management circuit 400. When power is initially supplied from the second power input device 414, the voltage feedback 4142 may include a voltage value of power input from the second power input device 414. A voltage value of the input second power may be measured by a voltage measurement circuit.

According to an embodiment of the present disclosure, when power is supplied from the second power input device 414, current feedback 4044, which is measurement information about a current of power may be transferred from the second power input device 414 to the current/voltage conversion circuit 402. The current feedback 4044 may include a current value calculated by comparing a voltage value (hereinafter, "a second voltage value") of power output from the second power input device 414 and a voltage reference (VREF) using the comparison circuit 408. Here, the voltage reference may be a voltage value initially set when power is input from the second power input device 414 and for example, may be a voltage of 5V. That is, the current feedback 4044 may be a current value calculated by a difference between the second voltage value and a reference voltage. The second voltage value may be measured using a coulomb-counter method by a voltage measurement circuit located at an intermediate point 4122 before power of the second power input device 414 is input to the battery charge circuit 404. A comparison process may be performed by the comparison circuit 408 and may be performed to determine whether a second output current reduces. For example, when constant voltage charge is performed, a second output current may gradually reduce.

According to embodiments of the present disclosure, when power is input from the first power input device 412 to the current/voltage conversion circuit 402, the current/voltage conversion circuit 402 may adjust a voltage (first output voltage) output from the current/voltage conversion circuit 402 based on the voltage feedback 4142 of the second power input device 414. Here, the voltage feedback 4142 may include a voltage value of power input from the second power input device 414 to the current/voltage conversion circuit 402.

According to an embodiment of the present disclosure, the current/voltage conversion circuit 402 may include a circuit that changes a first input voltage input from the first power input device 412 based on the voltage feedback 4142 and adjust a first output voltage. When the first input voltage input from the first power input device 412 and the second input voltage input from the second power input device 414 are different, the first output voltage output from the current/voltage conversion circuit 402 based on the voltage feedback 4142 (e.g., second input voltage) may be adjusted.

According to an embodiment of the present disclosure, when the first input voltage is at least equal to the second input voltage, by stepping down (lowering) the first output voltage based on the voltage feedback 4142, the current/voltage conversion circuit 402 may output the first output voltage to the battery charge circuit 404 such that the first output voltage has substantially the same voltage value as that of the second output voltage.

According to an embodiment of the present disclosure, when the first input voltage is lower than the second input voltage, by stepping up (i.e., adjusting higher) the first output voltage based on the voltage feedback 4142, the current/voltage conversion circuit 402 may output the first output voltage to the battery charge circuit 404 such that the first output voltage has substantially the same voltage value as that of the second output voltage.

For example, when a first input voltage of first power input from the first power input device 412 is 6.5V and when voltage feedback of second power input from the second power input device 414 is 4.5V, the current/voltage conversion circuit 402 may lower the first input voltage 6.5V input from the first power input device 412 to 4.5V, which is the second output voltage output from the second power input device 414 to the battery charge circuit 404 and may output 4.5V to the battery charge circuit 404.

As another example, when a first input voltage of first power input from the first power input device 412 is 4.5V and when voltage feedback of second power input from the second power input device 414 is 6.5V, the current/voltage conversion circuit 402 may step up the voltage 4.5V input from the first power to 6.5V, which is the second output voltage output from the second power input device 414 and output 6.5V to the battery charge circuit 404.

According to embodiments of the present disclosure, the current/voltage conversion circuit 402 may adjust a current input from the first power input device 412 based on the current feedback 4044 input from the second power input device 414 and output the current to the battery charge circuit 404. When second power is supplied from the second power input device 414, the current feedback 4044 may include a current value calculated by comparing a second voltage value and a voltage reference using the comparison circuit 408. The reference voltage may be a voltage value initially set when power is input from the second power input device 414. The reference voltage may be a voltage value set to monitor a voltage of power input from the second power input device 414.

For example, in the battery 406, a constant voltage charge may be performed, and the current/voltage conversion circuit 402 may step down (i.e., adjust lower) a first output current based on the current feedback 4044 input from the comparison circuit 408. When generally charging the battery 406, constant current charge that charges with a constant current and constant voltage charge that charges while gradually reducing a current may be performed.

According to an embodiment of the present disclosure, when a voltage of the battery 406 arrives at a full charging voltage, a second output current of the second power input device 414 may be reduced under the control of the power management circuit 400. Here, when charging the battery 406, a full charging voltage may be a voltage set to determine whether to perform constant current charge or constant voltage charge. The current/voltage conversion circuit 402 may control to reduce the first output current output from the current/voltage conversion circuit 402 based on the input current feedback 4044. The first output current may have a current value of an input current adjusted to be the same as the second output current by the current/voltage conversion circuit 402 when power is supplied from the first power input device 412. Accordingly, the adjusted first output current may be supplied to the battery charge circuit 404 through a path 'A'.

The battery charge circuit 404 may receive a current from the current/voltage conversion circuit 402 and the second power input device 414 to charge the battery 406.

When supplying a current to the battery 406, the battery charge circuit 404 may determine charge state information (e.g., a battery residual quantity, a battery voltage, and whether the battery is fully charged) of the battery 406. According to an embodiment of the present disclosure, the battery charge circuit 404 may determine whether a capacity (or level) of the battery 406 is in a full charging state.

According to the foregoing embodiments of the present disclosure, the power management circuit 400 may adjust a first output voltage and a first output current based on power information of the second power. Accordingly, the second input current may be actually the same as the second output current, and the second input voltage may be the same as the second output voltage.

Figure 5A:
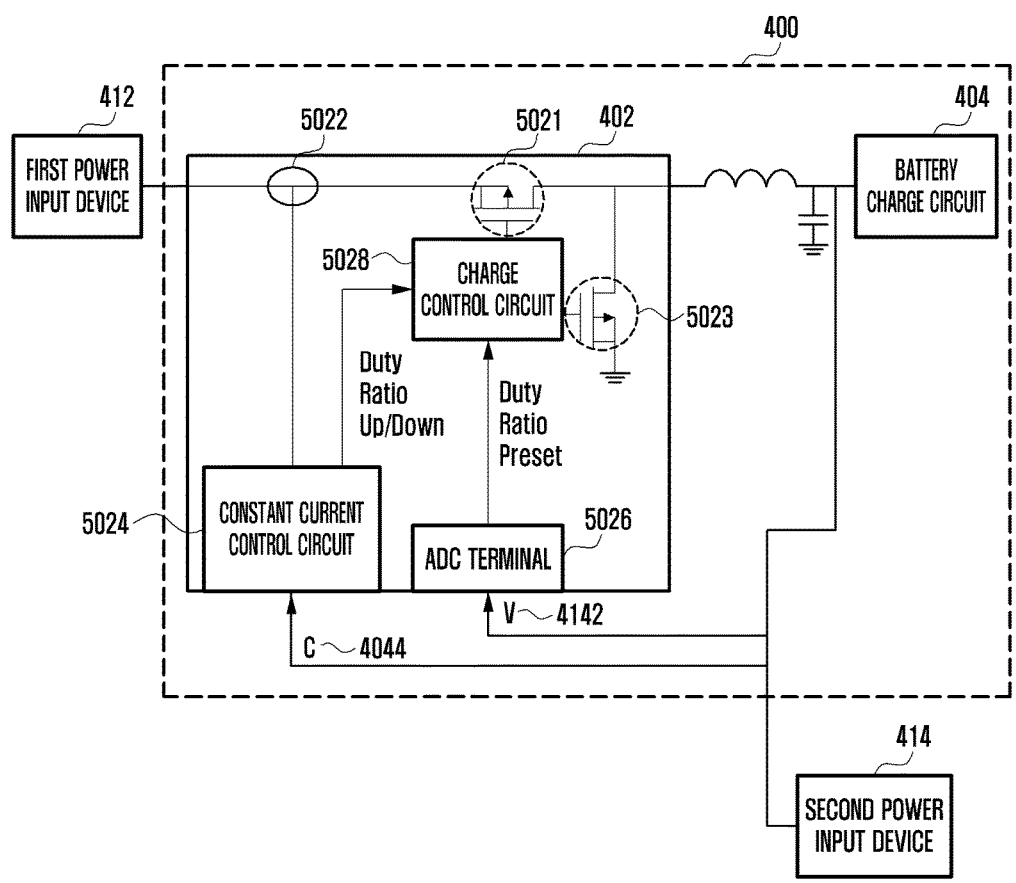
FIGS. 5A and 5B are circuit diagrams illustrating a current/voltage conversion circuit in a circuit that charges a battery of an electronic device according to an embodiment of the present disclosure.
Figure 5B:
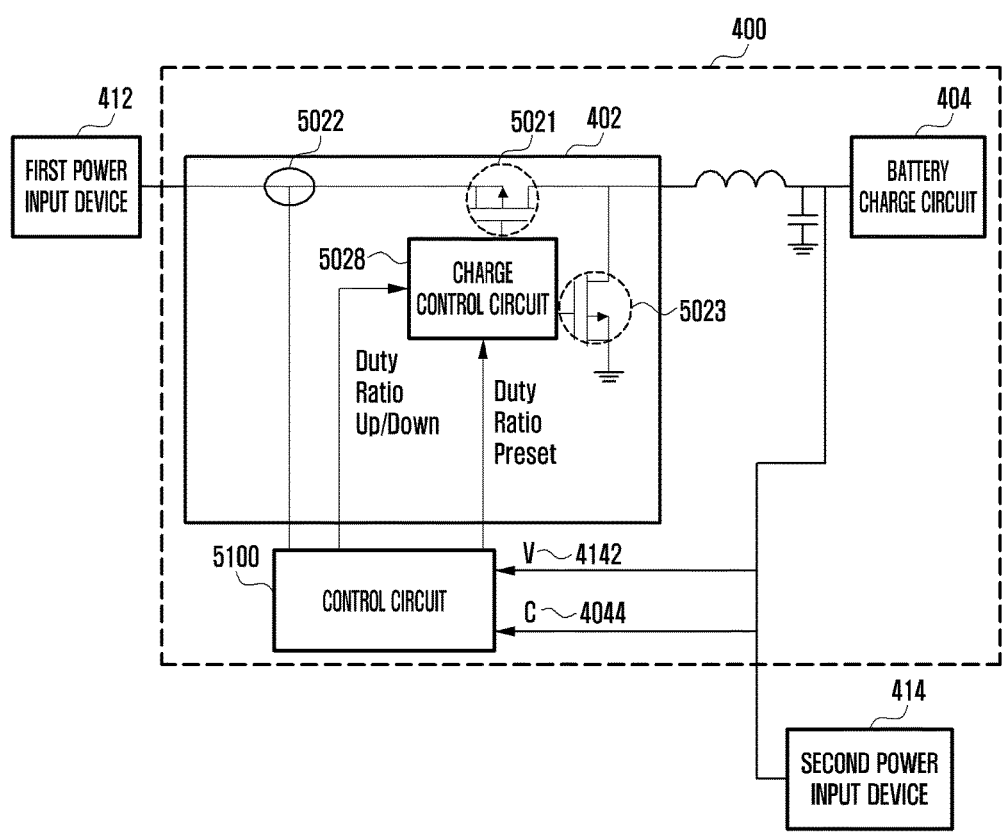

FIGS. 5A and 5B are circuit diagrams illustrating a current/voltage conversion circuit in a battery charge circuit of an electronic device according to an embodiment of the present disclosure.

Referring to FIG. 5A, an electronic device may charge the battery 406 using a plurality of power input devices (e.g., the first power input device 412 and the second power input device 414). Operations for charging the battery 406 may be controlled by the power management circuit 400, which is a separate constituent element other than a processor (e.g., the processor 210) for controlling the electronic device.

The power management circuit 400 includes the current/voltage conversion circuit 402 and the battery charge circuit 404. Further, the power management circuit 400 may further include a comparison circuit, as shown in FIG. 4.

According to an embodiment of the present disclosure, the current/voltage conversion circuit 402 may include a constant current control circuit 5024, ADC terminal 5026, and charge control circuit 5028.

According to an embodiment of the present disclosure, when second power is input from the second power input device 414, the ADC terminal 5026 may receive the voltage feedback 4142 input from the second power input device 414. As second power is input, the ADC terminal 5026 may transfer the voltage feedback 4142, which is voltage measurement information measured by a measurement circuit (not shown) to the charge control circuit 5028. Accordingly, the charge control circuit 5028 may set a first output voltage output from the current/voltage conversion circuit 402 to the battery charge circuit 404 based on the voltage feedback 4142.

For example, if a first input voltage is at least equal to a second input voltage, the charge control circuit 5028 may step down an output voltage of the current/voltage conversion circuit 402 to be the same as a second output voltage of second power based on the voltage feedback 4142. Here, the second output voltage may be substantially the same as the first input voltage input through the second interface.

However, if a first voltage is lower than a second voltage, the charge control circuit 5028 may step up a first output voltage of the current/voltage conversion circuit 402 to be the same as a second output voltage of second power based on the voltage feedback 4142. Here, the second output voltage may be substantially the same as the first input voltage input through the second interface.

According to an embodiment of the present disclosure, when second power is input from the second power input device 414, the constant current control circuit 5024 may receive an input of the current feedback 4044. The current feedback 4044 may include a current value calculated by comparing a second output voltage (i.e., the "second voltage value") of second power output from the second power input device 414 through the second interface and a voltage reference VREF using the comparison circuit.

Further, the constant current control circuit 5024 may monitor a current (hereinafter, "first input current") input from the first power to the current/voltage conversion circuit 402 at 5022. Monitoring may be measured with a coulomb-counter method by a current measurement unit. The constant current control circuit 5024 may transfer duty ratio setting information that can adjust a first output current output from the current/voltage conversion circuit 402 to the charge control circuit 5028.

According to an embodiment of the present disclosure, the charge control circuit 5028 is a separate constituent element from a control circuit (e.g., the processor 210 of FIG. 2) constituting the electronic device and may charge the battery 406 with power (e.g., the first power and the second power) input from the first power input device 412 and the second power input device 414.

The charge control circuit 5028 may adjust a duty ratio based on the voltage feedback 4142 received from the second power input device 414 through the ADC terminal 5026. The charge control circuit 5028 may adjust a duty ratio based on the current feedback 4044 received from the second power input device 414 through the constant current control circuit 5024. Here, the duty ratio means a ratio of a high signal segment within one period. By adjusting a duty ratio based on the voltage feedback 4142, the charge control circuit 5028 may adjust a first output voltage output from the current/voltage conversion circuit 402. By adjusting a duty ratio based on the current feedback 4044, the charge control circuit 5028 may adjust a first output current output from the current/voltage conversion circuit 402.

The current/voltage conversion circuit 402 further includes metal-oxide semiconductor field-effect-transistors (MOSFETs) 5021 and 5023. When power is input from the power input device, the MOSFET may enable power of the battery not to be supplied to a system of the electronic device.

Referring to FIG. 5B, the electronic device may charge the battery 406 using the first power input device 412 and the second power input device 414.

Operations for charging the battery 406 may be controlled by the power management circuit 400, which is a separate constituent element other than a processor (e.g., the processor 210 of FIG. 2) that controls the electronic device.

The power management circuit 400 includes the current/voltage conversion circuit 402 and the battery charge circuit 404.

In FIG. 5B, a control circuit 5100 is included in the power management circuit 400, but may be a separate constituent element from the power management circuit 400 and may be the processor 210 of FIG. 2. Accordingly, the control circuit 5100 may equally perform operations performed by the constant current control circuit 5024 and the ACD terminal 5026 of FIG. 5A. That is, the power management circuit 400 may be controlled by the control circuit 5100.

The current/voltage conversion circuit 402 of the electronic device according to an embodiment of the present disclosure may receive the voltage feedback 4142 and the current feedback 4044 according to application of power of the second power input device 414 from the control circuit 5100. Here, the control circuit 5100 may be the same constituent element as the processor 210 of FIG. 2 and may perform the same function as that of the constant current control circuit 5024 and the ADC terminal 5026 of FIG. 5A. That is, when the control circuit 5100 receives an input of the voltage feedback 4142 from the second power input device 414, the control circuit 5100 may transfer the voltage feedback 4142 to the charge control circuit 5028. When the control circuit 5100 receives an input of the current feedback 4044 from the second power input device 414, the control circuit 5100 may transfer the current feedback 4044 to the charge control circuit 5028. In FIG. 5B, a detailed description corresponds to that of FIG. 5A and therefore a detailed description thereof is omitted herein.

In an embodiment of the present disclosure, operation of the charge control circuit 5028 may be performed under the control of the control circuit 5100. The charge control circuit 5028 may operate under the control of the power management circuit 400.

Figure 6A:
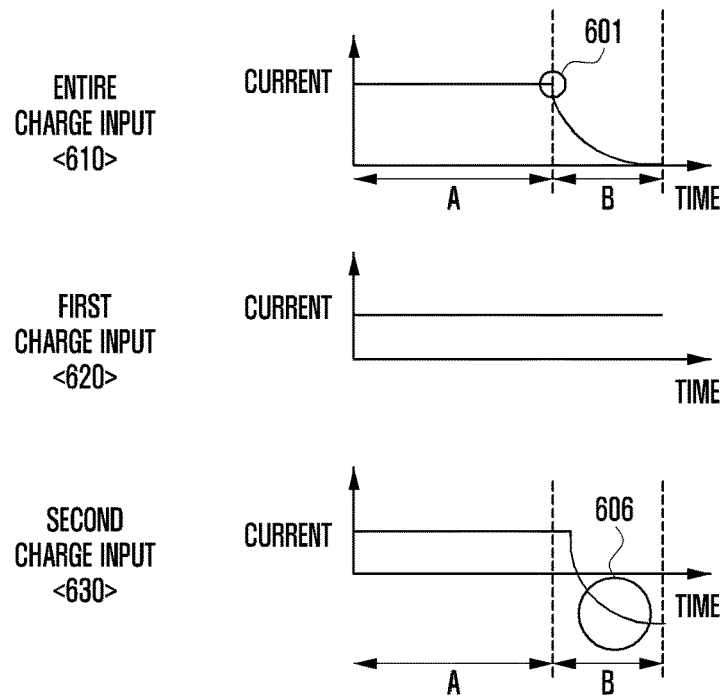
FIGS. 6A and 6B are graphs illustrating charging of a battery according to a time and current according to an embodiment of the present disclosure.
Figure 6B:
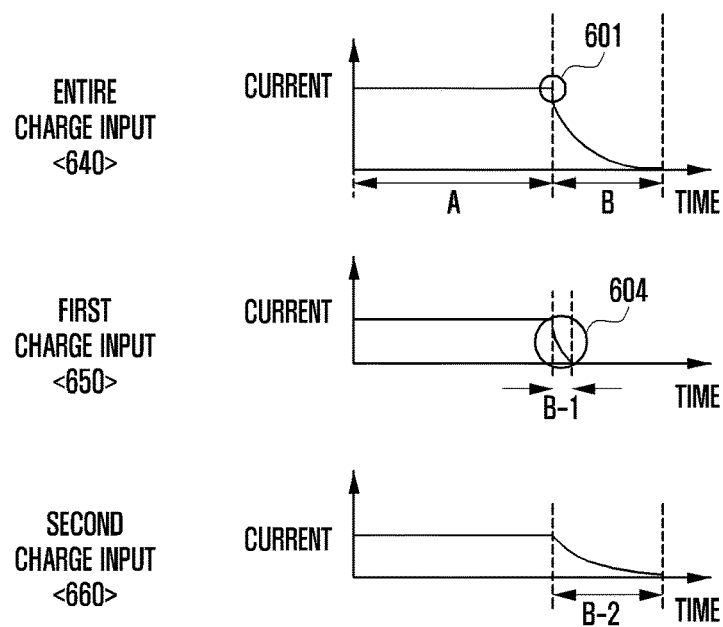

FIGS. 6A and 6B are graphs illustrating charging of a battery according to a time and current according to an embodiment of the present disclosure.

Referring to FIGS. 4, 6A, and 6B, FIG. 6A is a diagram illustrating a problem that a reverse current occurs when the current/voltage conversion circuit 402 does not receive the current feedback 4044 input from the second power input device 414.

FIG. 6B is a diagram illustrating operation of charging the battery 406 without a reverse current when the current/voltage conversion circuit 402 receives the current feedback 4044 input from the second power input device 414.

The battery charge circuit 404 may arrive at a time point at which a voltage of the battery 406 becomes a full charging voltage while performing constant current charge. When a voltage of the battery 406 becomes a full charging voltage, the battery charge circuit 404 may perform constant voltage charge.

The battery charge circuit 404 may perform charge with a constant current value when performing constant current charge. At this time, a charge voltage may gradually step up.

The battery charge circuit 404 may perform charge with a gradually reducing current value when performing constant voltage charge. At this time, a charge voltage may be constant.

The full charging voltage may be a voltage value to be a reference to determine whether the battery 406 is fully charged. If a voltage of the battery 406 is not a full charging voltage, the battery charge circuit 404 may perform constant current charge, and if a voltage of the battery 406 is a full charging voltage, the battery charge circuit 404 may perform constant voltage charge.

Referring to FIG. 6A, an entire charge input 610 may be a current value input from a plurality of power input devices (e.g., the first power input device 412, the second power input device 414) to the battery 406.

A first charge input 620 may be a current value input to the battery 406 by the first power input device 412.

A second charge input 630 may be a current value input to the battery 406 by the second power input device 414.

The entire charge input 610 that charges the battery 406 may perform constant voltage charge from a time point 601 at which a voltage of the battery 406 arrives at a full charging voltage while performing constant current charge.

At a constant current charge segment A, a current value may be constant and a voltage value may step up. At a constant voltage charge segment B, a current value may gradually reduce, and a voltage value may be constant.

If a voltage of the battery 406 is less than a full charging voltage, the battery 406 may receive a current through constant current charge at the constant current charge segment A. Constant current charge may be sequentially performed with a constant value of current, and a charge voltage may step up.

If a voltage of the battery 406 is at least equal to a full charging voltage, the battery 406 may receive a gradually reducing value of current through constant voltage charge at the constant voltage charge segment B.

Since the battery charge circuit 404 may estimate a predetermined full charging voltage of the battery 406 connected to an output terminal of the battery charge circuit 404, the battery charge circuit 404 may adjust a second output current. That is, the battery charge circuit 404 may adjust to reduce the second output current at the constant voltage charge segment B, as in the second charge input 630.

When the current/voltage conversion circuit 402 does not receive an input of the current feedback 4044 from the second power input device 414, the current/voltage conversion circuit 402 cannot adjust a first output current. This is because the current/voltage conversion circuit 402 cannot estimate a value of power to be input from the second power input device 414 connected to an output terminal of the current/voltage conversion circuit 402. Because the current/voltage conversion circuit 402 cannot estimate a value of power to be input from the second power input device 414, when current feedback is not input from the second power input device 414, at the constant voltage charge segment B, the current/voltage conversion circuit 402 may continuously supply the first output current to the battery and the charge circuit 404 with the same value, as in the first charge input 620.

When the current/voltage conversion circuit 402 does not receive an input of current feedback, the first output current may output a constant current value, and the battery charge circuit 404 may control the second output current based on a full charging voltage of the battery 406. As the first output current, a constant current value is output and the second output current is controlled, and thus reversal of the second output current may occur at the constant voltage charge segment B, as in 606.

According to an embodiment of the present disclosure, at the constant voltage charge segment B, in order to prevent a reverse current from occurring, the current/voltage conversion circuit 402 may receive an input of the current feedback 4044.

FIG. 6B is a diagram illustrating operation of charging the battery 406 without a reverse current, as the current/voltage conversion circuit 402 according to various embodiments receives an input of the current feedback 4044 related to a second output current output from the second power input device 414.

Referring to an entire charge input 640 of FIG. 6B, as in the entire charge input 610, the entire charge input 640 of the battery 406 enables to perform constant current charge at a constant current charge segment A, and when a voltage of the battery 406 arrives at a time point 601 at which the voltage of the battery 406 is at least equal to a full charging voltage, at a constant voltage charge segment B, the entire charge input 640 may enable to perform constant voltage charge. At the constant voltage charge segment B, the entire charge input 640 of the battery 406 may enable to charge with the same current value and to charge with a gradually reducing current value from a time point 601 at which the voltage of the battery 406 arrives at a full charging voltage.

According to an embodiment of the present disclosure, the entire charge input 640y be the sum of current values input from power input devices (e.g., the first power input device 412, the second power input device 414) that supply power in order to charge the battery 406. For example, the entire charge input 640 may be the sum of current values of a first charge input 650 and a second charge input 660. Accordingly, a current value at the constant voltage charge segment B of the entire charge input 640 may be the sum of a current value of a constant voltage charge segment B-1 in the first charge input 650 and a current value of a constant voltage charge segment B-2 in the second charge input 660.

According to an embodiment of the present disclosure, in the entire charge input 640 graph, if a voltage of the battery 406 is at least equal to a full charging voltage, the battery charge circuit 404 may maintain a full charging voltage and gradually reduce a current that charges the battery 406 at the constant voltage charge segment 'B'.

In order to reduce a current that charges the battery 406, the battery charge circuit 404 may control to reduce a second output current. For example, the second output current may reduce at the constant voltage charge segment B-2, as in the second charge input 660 graph.

As the second output current reduces, the current feedback 4044 corresponding to the reduced second output current may be input to the current/voltage conversion circuit 402. The current feedback 4044 may be obtained by comparing a reference voltage first input from the second power input device 414 and a reduced voltage value and may be input to the current/voltage conversion circuit 402. A comparing process corresponds to that of FIG. 4 and therefore a detailed description thereof will be omitted.

According to various embodiments of the present disclosure, as a second output current of the second power input device 414 receives an input of the current feedback 4044, which is gradually reducing information at a constant voltage charge segment B-2, the current/voltage conversion circuit 402 may adjust to reduce a first output current 604 of the first charge input 650 at a constant voltage charge segment B-1. At the constant voltage charge segment B-1, as a first output current of the first charge input 650 is controlled through the current feedback 4044, at a constant voltage charge segment B-2 of a second charge input 660, a reverse current may not occur.

According to an embodiment of the present disclosure, a current reduction amount (or a slope) of the first charge input 650 may be greater than a current reduction amount (or a slope) of the second charge input 660. For example, as the current/voltage conversion circuit 402 receives an input of the current feedback 4044, at the constant voltage charge segment B-1 of the first charge input 650, the current/voltage conversion circuit 402 may quickly reduce the first output current 604, and at the constant voltage charge segment B of the entire charge input 640, the current/voltage conversion circuit 402 may perform charge through a current of the second charge input 660. The power management circuit 400 may control to quickly reduce the first output current 604 or to stop a current from being output to the battery charge circuit 404.

According to an embodiment of the present disclosure, an electronic device may include a housing; a battery disposed within the housing; a first interface electrically or electromagnetically connected to a first external power source; a second interface electrically or electromagnetically connected to a second external power source; and a circuit electrically connected to the battery, the first interface, and the second interface, wherein the circuit changes a first voltage output from the first interface based on a second voltage output from the second interface, changes a first current output from the first interface based on a second current output from the second interface, and charges the battery based on the changed first current and second current.

According to an embodiment of the present disclosure, in an electronic device, the changed first voltage may be substantially the same as the second voltage.

According to an embodiment of the present disclosure, in an electronic device, the circuit may detect reduction of the second current and reduce the first current based on the detection.

According to an embodiment of the present disclosure, in an electronic device, the first power source may output the first voltage and the first current based on power received by wireless.

According to an embodiment of the present disclosure, the electronic device may further include a connector connected to the second external power source, wherein the electronic device may output the second voltage and the second current based on power received from the second external power source through the connector.

According to an embodiment of the present disclosure, in an electronic device, the circuit may step up the first voltage, if the first voltage is lower than the second voltage and step down the first voltage, if the first voltage is at least equal to the second voltage.

According to an embodiment of the present disclosure, in an electronic device, the circuit may receive the second voltage and the second current from the second interface, reduce the second current at a time point at which a voltage of the battery becomes a predetermined voltage, and reduce the first current according to the reduced second current.

According to an embodiment of the present disclosure, in an electronic device, the circuit may not receive power from the first external power source through the first interface by a predetermined time, when the second external power is input through the second interface while the first external power is input through the first interface.

According to an embodiment of the present disclosure, in an electronic device, the first external power source and the second external power source may be a wireless charge device or a wire charge device.

According to an embodiment of the present disclosure, an electronic device includes a housing; a battery disposed within the housing; a first interface electrically or electromagnetically connected to a first external power source; a second interface electrically or electromagnetically connected to a second external power source; and a circuit electrically connected to the battery, the first interface, and the second interface, wherein the circuit includes: a battery charge circuit having one side connected in series to the second interface and the other side connected in series to the battery; a current/voltage conversion circuit having one side connected in series to the first interface and the other side connected in series to the battery charge circuit; and a comparison circuit located between the second interface and the current/voltage conversion circuit and having one side connected in series to the second interface and the other side connected in series to the current/voltage conversion circuit.

According to an embodiment of the present disclosure, in an electronic device, the current/voltage conversion circuit may change a first voltage output from the first interface based on a second voltage output from the second interface and change a first current output from the first interface based on a second current output from the second interface.

Figure 7A:
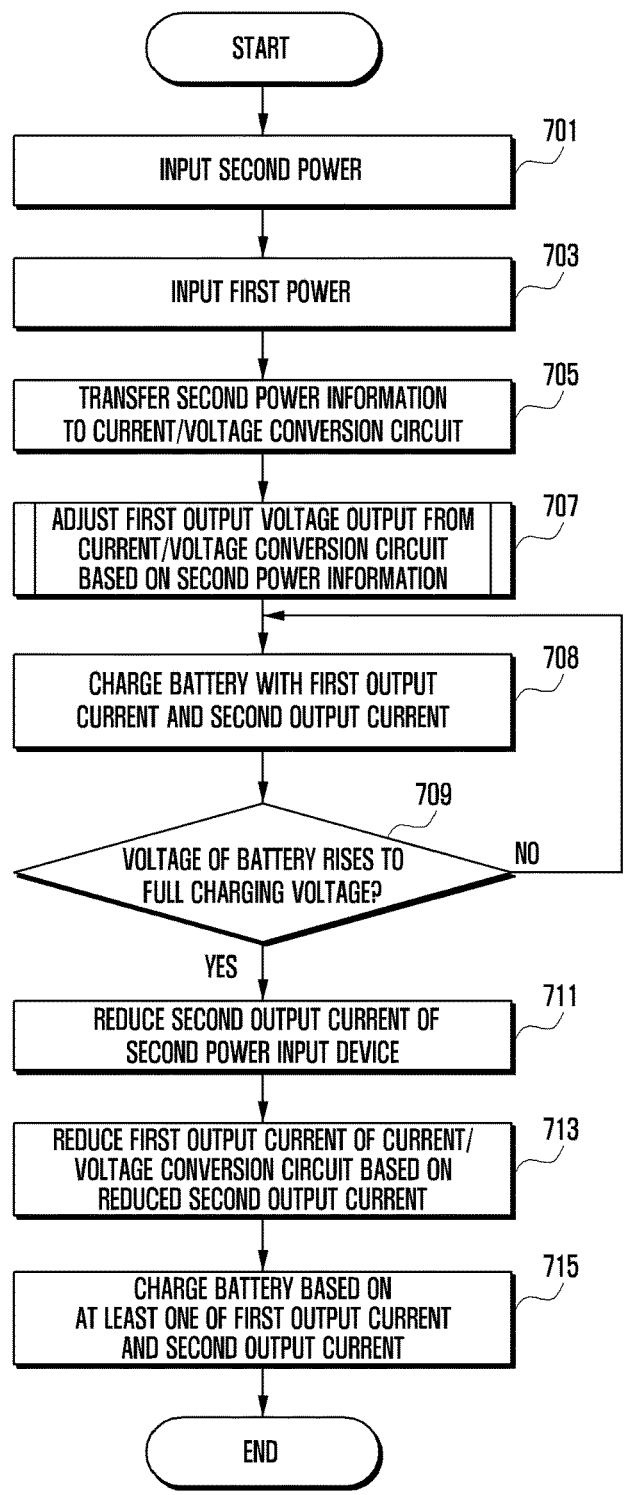
Figure 7B:
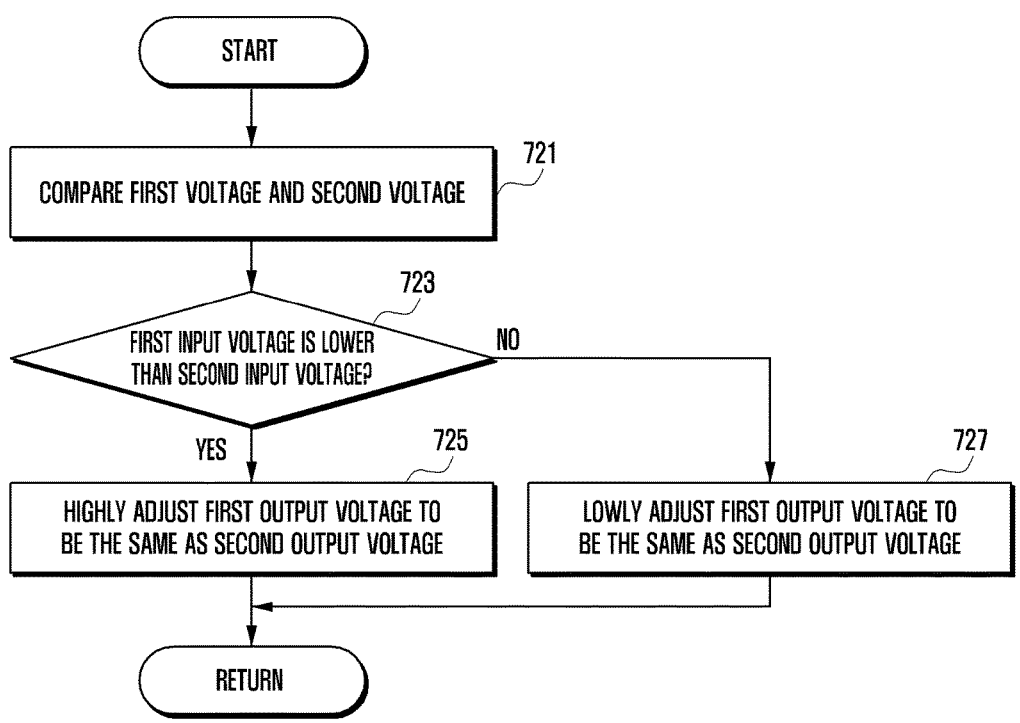

FIGS. 7A, 7B, and 8 are flowcharts illustrating an example of charging a battery in a circuit having a plurality of power inputs according to an embodiment of the present disclosure.

Referring to FIGS. 4 and 7A, the power management circuit 400 (e.g., the power management module 295 of FIG. 2) may detect an input of second power at step 701. The second power may be power input from the second power input device 414 to the battery charge circuit 404 through the second interface. The power management circuit 400 may control general operations for charging the battery 406.

The power management circuit 400 may detect an input of first power while inputting the second power at step 703. The first power may be power input from the first power input device 412 to the power management circuit 400 through the first interface. Accurately, the first power may be power input from the first power input device 412 to the current/voltage conversion circuit 402 of the power management circuit 400.

In FIG. 7A, a description of the first power and the second power corresponds to that of FIG. 4 and therefore a detailed description thereof will be omitted.

The power management circuit 400 may transfer second power information to the current/voltage conversion circuit 402 at step 705. The second power information may be current feedback 4044 or voltage feedback 4142, which is measurement information of the second power. When power is supplied from the second power input device 414, the voltage feedback 4142 may include an initial voltage value of power input to the second power input device 414. The initial voltage value may be a reference voltage. The current feedback 4044 may be a current value calculated by a difference between a voltage value of the second power and a reference voltage. The voltage value of the second power may be measured using a coulomb-counter method by a voltage measurement circuit located at the intermediate point 4122 before power of the second power input device 414 is input to the battery charge circuit 404.

For example, if a voltage of the battery 406 is at least equal to a full charging voltage, the power management circuit 400 may control to reduce a current in which the second power input device 414 outputs. Accordingly, a compared current value of a current corresponding to a predetermined reference voltage when power is initially supplied and a present current measured when a voltage of the battery 406 is a full charging voltage may be the current feedback 4044.

According to an embodiment of the present disclosure, the power management circuit 400 may know a change of a current value by a difference between an initial voltage value and a present voltage value. For example, if a voltage of the battery 406 is at least equal to a full charging voltage, the power management circuit 400 may know reduction of a current input from the second power input device 414 by the current feedback 4044. If a voltage of the battery 406 is at least equal to a full charging voltage, the current feedback 4044 may be a current value reduced to correspond to reduction of a current value input from the second power input device 414.

The power management circuit 400 may adjust a first output voltage output from the current/voltage conversion circuit 402 based on second power information at step 707. The second power information may be voltage feedback and current feedback. A detailed process thereof will be described with reference to FIG. 7B.

Referring to FIG. 7B, the power management circuit 400 according to various embodiments may compare a first voltage of a first power source and a second voltage of a second power source at step 721. The first voltage is a first input voltage input from the first power input device 412 to the current/voltage conversion circuit 402, and a second voltage is a second input voltage input from the second power input device 414 and is a second input voltage provided to the current/voltage conversion circuit 402 and may include the voltage feedback 4142.

If a first input voltage is lower than a second input voltage at step 723, the power management circuit 400 may step up (adjust to be higher) the first output voltage to be the same as the second output voltage at step 725. That is, the power management circuit 400 may step up (adjust to be higher) the first output voltage to be the same as the second output voltage based on the voltage feedback 4142, which is one of second power information. The first input voltage may be a voltage value input from the first power input device 412 through a first interface, and the second input voltage may be a voltage value input from the second power input device 414 through a second interface. The first output voltage may be a voltage output from the current/voltage conversion circuit 402 to the battery charge circuit 404 and may be a voltage in which a first input voltage is adjusted based on the voltage feedback 4142. The second output voltage may be a voltage output from the second interface to the battery charge circuit 404 and may be the same as a second input voltage.

If a first input voltage is at least equal to a second input voltage at step 723, the power management circuit 400 may step down (adjust to be lower) the first output voltage to be the same as the second output voltage at step 727. That is, the power management circuit 400 may control the current/voltage conversion circuit 402 based on the voltage feedback 4142, which is one of second power information to step down (adjust to be lower) the first output voltage to be the same as the second output voltage.

Referring again to FIG. 7A, the power management circuit 400 may charge the battery 406 with a first output current and a second output current at step 708. The first output current may be a current output from the current/voltage conversion circuit 402 to the battery charge circuit 404. The second output current may be a current output from the second interface to the battery charge circuit 404.

In an embodiment of the present disclosure, as the first output voltage is adjusted to be the same as the second output voltage, the power management circuit 400 may charge the battery 406 with the first output current and the second output current having the same current value. When performing constant current charge, the power management circuit 400 may control the first output current to be the same as the second output current.

The power management circuit 400 may determine whether a voltage of the battery 406 rises to a full charging voltage at step 709. Here, the full charging voltage may be a value set to a reference for performing constant voltage charge when charging the battery 406. The power management circuit 400 may perform constant current charge until a time point at which a voltage of the battery 406 becomes a full charging voltage. When performing constant current charge, a charge current becomes constant, but a charge voltage may rise. When a voltage of the battery 406 arrives at a full charging voltage, the power management circuit 400 may perform constant voltage charge. When performing constant voltage charge, the power management circuit 400 may control a charge voltage to be constant and to reduce a charge current that charges the battery 406.

If a voltage of the battery 406 rises to a full charging voltage, the power management circuit 400 may control to perform constant voltage charge and to reduce a second output current of the second power input device 414 at step 711. The power management circuit 400 may control the current/voltage conversion circuit 402 to reduce a first output current based on the current feedback 4044 corresponding to a reduced second output current at step 713. That is, the power management circuit 400 may control the current/voltage conversion circuit 402 to receive the current feedback 4044. The power management circuit 400 may reduce an output current of the current/voltage conversion circuit 402 according to the reduced second output current based on the current feedback 4044. In an embodiment of the present disclosure, the power management circuit 400 may reduce or stop a first output current of the first power input device 412.

The power management circuit 400 may charge the battery 406 based on at least one of an output current of the current/voltage conversion circuit 402 and a second output current output from the second power input device 414 through the second interface at step 715. When a voltage of the battery 406 arrives at a full charging voltage, the power management circuit 400 may perform constant voltage charge.

If a voltage of the battery 406 does not rise to a full charging voltage at step 709, the power management circuit 400 may perform constant current charge based on the first output current and the second output at step 708. The first output current may be a current value adjusted based on the current feedback 4044 of the second power input device 414, and the second output current may be a current value of second power input from the second power input device 414 to the second interface and be output through the second interface.

The foregoing operations may be repeatedly performed until charging of the battery 406 is terminated by the power management circuit 400. Termination of charging of the battery 406 may be termination of connection of the power input device (e.g., first power input device 412, second power input device 414) and the power management circuit 400.

FIG. 8 is a flowchart illustrating an example of charging a battery in a circuit having a plurality of power inputs according to an embodiment of the present disclosure.

First power may be power input from the first power input device 412 to the current/voltage conversion circuit 402 through the first interface. The second power may be power input from the second power input device 414 to the battery charge circuit through the second interface.

The power management circuit 400 may detect an input of first power at step 801. The power management circuit 400 may detect an input of second power at step 803. When the second power is input from the second power input device 414, the power management circuit 400 may input the voltage feedback 4142 and the current feedback 4044 to the current/voltage conversion circuit 402.

In order to prevent a reverse current from occurring due to a difference between a first input voltage and a second input voltage, the power management circuit 400 may turn off the current/voltage conversion circuit 402 for a predetermined time (e.g., 1 second) at step 804. While the current/voltage conversion circuit 402 is turned off for a predetermined time, the power management circuit 400 may compare the first input voltage and the second input voltage. The first input voltage may be a voltage value input from the first power input device 412 through a first interface, and the second input voltage may be a voltage value input from the second power input device 414 through a second interface.

Thereafter, the power management circuit 400 transfers second power information to the current/voltage conversion circuit 402 at step 805, and such an operation is the same as operation of step 705, and operations 807 to 815 are the same as those of FIG. 7 and therefore a detailed description thereof will be omitted.

In the foregoing embodiment of the present disclosure, it has been described that the order of receiving an input of first power and second power is different, but the first power and second power may be simultaneously input.

According to an embodiment of the present disclosure, a method of charging a battery of an electronic device includes detecting an input of first external power and second external power; changing a first voltage output by the first external power source based on a second voltage input by the second external power source; changing a first current output by the first external power source based on a second current input by the second external power source; and charging the battery based on the first current and the second current.

According to an embodiment of the present disclosure, in a method of charging a battery of an electronic device, changing a first voltage output by the first external power source based on a second voltage input by the second external power source may include changing the first voltage to be substantially the same as the second voltage.

According to an embodiment of the present disclosure, in a method of charging a battery of an electronic device, changing a first current output by the first external power source based on a second current input by the second external power source may include: detecting reduction of the second current based on information of the battery; and reducing the first current, as the second current reduces.

According to an embodiment of the present disclosure, in a method of charging a battery of an electronic device, detecting reduction of the second current based on information of the battery may include reducing the second current, when a voltage of the battery is a full charging voltage.

According to an embodiment of the present disclosure, in a method of charging a battery of an electronic device, detecting an input of first external power and second external power may include outputting the first voltage and the first current based on power received by wireless from the first external power source. In a method of charging a battery of an electronic device, detecting an input of first external power and second external power may include outputting the second voltage and the second current based on power received from the second external power source.

According to an embodiment of the present disclosure, in a method of charging a battery of an electronic device, changing a first voltage output by the first external power source based on a second voltage input by the second external power source may include: stepping up, by the circuit, if the first voltage is lower than the second voltage, the first voltage; and setting the changed first voltage to be substantially the same as the second voltage.

According to an embodiment of the present disclosure, in a method of charging a battery of an electronic device, changing a first voltage output by the first external power source based on a second voltage input by the second external power source may include: stepping down, by the circuit, if the first voltage is at least equal to the second voltage, the first voltage; and setting the changed first voltage to be substantially the same as the second voltage.

According to an embodiment of the present disclosure, in a method of charging a battery of an electronic device, detecting an input of first external power and second external power may include controlling not to receive first external power from the first external power source by a predetermined time through the first interface, when the second external power is input through a second interface while the first external power is input through a first interface.

As described above, according to various embodiments of the present disclosure, an electronic device can charge quickly and safely a battery simultaneously using a plurality of power sources having different voltages.

Although embodiments of the present disclosure have been described in detail hereinabove, it should be clearly understood that many variations and modifications of the basic inventive concepts herein described, which may appear to those skilled in the art, will still fall within the spirit and scope of the embodiments of the present disclosure as defined in the appended claims and their equivalents.

What is claimed is:
1. An electronic device, comprising:
   a housing;
   a battery disposed within the housing;
   a first interface electrically connected to a first external power source;
   a second interface electrically connected to a second external power source; and
   a circuit electrically connected to the battery, the first interface, and the second interface,
   wherein the circuit changes a first voltage output from the first interface based on a second voltage output from the second interface, changes a first current output from the first interface based on a second current output from the second interface, and charges the battery based on the changed first current and second current.

2. The electronic device of claim 1, wherein the changed first voltage is substantially the same as the second voltage.

3. The electronic device of claim 1, wherein the circuit detects reduction of the second current and reduces the first current based on the detection.

4. The electronic device of claim 1, wherein the first power source outputs the first voltage and the first current based on power wirelessly received.

5. The electronic device of claim 1, further comprising a connector connected to the second external power source,
   wherein the electronic device outputs the second voltage and the second current based on power received from the second external power source through the connector.

6. The electronic device of claim 1, wherein the circuit steps up the first voltage, if the first voltage is lower than the second voltage and steps down the first voltage, if the first voltage is at least equal to the second voltage.

7. The electronic device of claim 1, wherein the circuit receives the second voltage and the second current from the second interface, reduces the second current at a time point at which a voltage of the battery becomes a predetermined voltage, and reduces the first current according to the reduced second current.

8. The electronic device of claim 1, wherein the circuit does not receive power from the first external power source through the first interface by a predetermined time, when the second external power is input through the second interface while the first external power is input through the first interface.

9. The electronic device of claim 1, wherein the first external power source and the second external power source are a wireless charge device or a wired charge device.

10. A method of charging a battery of an electronic device, the method comprising:
    detecting an input of first external power from a first external power source and second external power from a second external power source;
    changing a first voltage output by the first external power source based on a second voltage input by the second external power source;
    changing a first current output by the first external power source based on a second current input by the second external power source; and
    charging the battery based on the first current and the second current.

11. The method of claim 10, wherein changing a first voltage output by the first external power source based on a second voltage input by the second external power source comprises changing the first voltage to be substantially the same as the second voltage.

12. The method of claim 10, wherein changing a first current output by the first external power source based on a second current input by the second external power source comprises:
  detecting reduction of the second current based on information of the battery; and
  reducing the first current, as the second current reduces.

13. The method of claim 12, wherein detecting reduction of the second current based on information of the battery comprises reducing the second current, when a voltage of the battery is a full charging voltage.

14. The method of claim 10, wherein detecting an input of first external power and second external power comprises outputting the first voltage and the first current based on power received by wireless from the first external power source.

15. The method of claim 10, wherein detecting an input of first external power and second external power comprises outputting the second voltage and the second current based on power received from the second external power source.

16. The method of claim 10, wherein changing a first voltage output by the first external power source based on a second voltage input by the second external power source comprises:
  stepping up, by the circuit, if the first voltage is lower than the second voltage, the first voltage; and
  setting the changed first voltage to be substantially the same as the second voltage.

17. The method of claim 10, wherein changing a first voltage output by the first external power source based on a second voltage input by the second external power source comprises:
  stepping down, by the circuit, if the first voltage is at least equal to the second voltage, the first voltage; and
  setting the changed first voltage to be substantially the same as the second voltage.

18. The method of claim 10, wherein detecting an input of first external power and second external power comprises controlling not to receive first external power from the first external power source by a predetermined time through the first interface, when the second external power is input through a second interface while the first external power is input through a first interface.

19. An electronic device, comprising:
  a housing;
  a battery disposed within the housing;
  a first interface electrically connected to a first external power source;
  a second interface electrically connected to a second external power source; and
  a circuit electrically connected to the battery, the first interface, and the second interface,
  wherein the circuit comprises:
  a battery charge circuit having one side connected in series to the second interface and the other side connected in series to the battery;
  a current/voltage conversion circuit having one side connected in series to the first interface and the other side connected in series to the battery charge circuit; and
  a comparison circuit located between the second interface and the current/voltage conversion circuit and having one side connected in series to the second interface and the other side connected in series to the current/voltage conversion circuit.

20. The electronic device of claim 19, wherein the current/voltage conversion circuit changes a first voltage output from the first interface based on a second voltage output from the second interface and changes a first current output from the first interface based on a second current output from the second interface.

* * * * *